June 5, 1951
LA VERNE R. PHILPOTT
2,555,368
TRANSCONDUCTANCE TESTER
Filed April 1, 1946
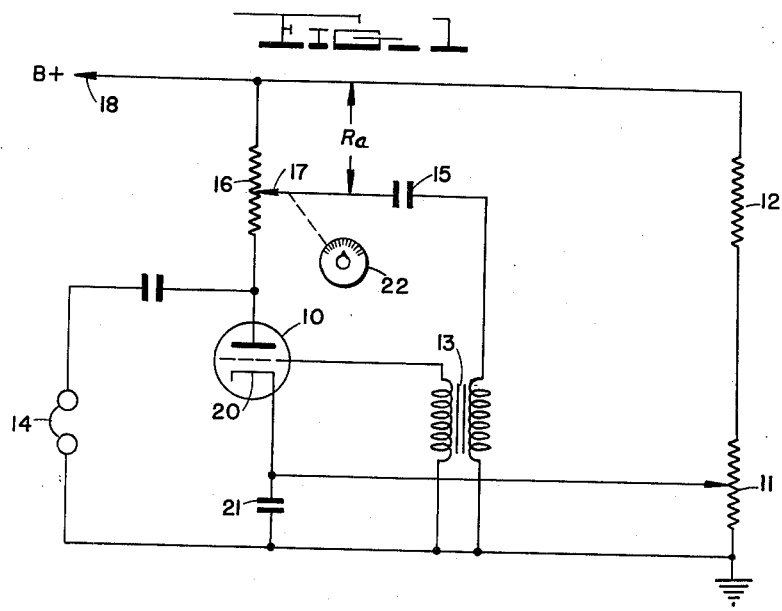
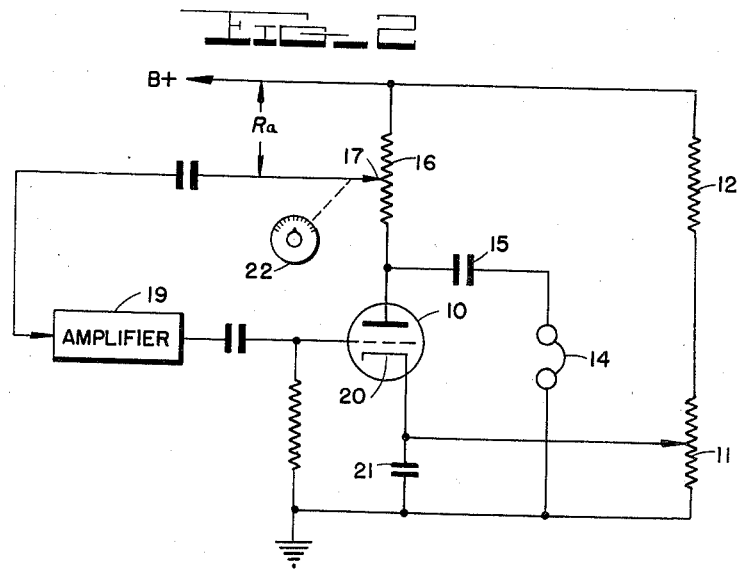
INVENTOR.
LA VERNE R. PHILPOTT
BY
*M. C. Hayes*
ATTORNEY Patented June 5, 1951

2,555,368

UNITED STATES PATENT OFFICE 2,555,368

TRANSCONDUCTANCE TESTER

La Verne R. Philpott, Washington, D. C.

Application April 1, 1946, Serial No. 658,717

5 Claims. (Cl. 315—368)

(Granted under the act of March 3, 1883, as amended April 30, 1928; 370 O. G. 757)

This invention relates in general to electronic testing equipment and in particular to a method of and apparatus for determining the transconductance characteristic of a thermionic vacuum tube.

A condition which has long been recognized as a necessary requirement to the institution of oscillations in a simple vacuum tube oscillator circuit, is that the gain of the vacuum tube stage be equal to, or greater than, unity. Advantage is taken of this phenomenon in practicing the novel method taught by the invention, and in providing the apparatus for carrying out the novel method.

In general, the invention comprises the thermionic vacuum tube whose transconductance is to be determined, and a feedback circuit associated therewith. The feedback circuit is made adjustable so that the amount of feedback can be selectably controlled to a point where thermal agitation and other internal disturbances cause the circuit to oscillate. At the threshold of oscillation the gain of the vacuum tube stage is unity, or some fractional part of unity if the feedback component receives amplification. Consequently, since the gain of the vacuum tube bears a definite and known relationship with respect to its transconductance characteristic, the feedback circuit can be calibrated directly in terms of micromhos and the transconductance of the tube read directly therefrom. Additionally, since the system of the invention provides its own source of excitation potential, it permits transconductance measurements to be made over a range of operating levels, heretofore unexplorable by systems which required external excitation of small and almost immeasurable amplitudes.

Oscillations can be detected by any suitable means well known to the art; such as for instance, an audio reproducing device (when the oscillator functions in the audio frequency spectrum), an alternating current metering circuit, or a suitable visual indicating arrangement.

It is accordingly an object of this invention to provide a method of and apparatus for determining the transconductance characteristics of a thermionic vacuum tube.

It is another object of this invention to provide a method of determining the transconductance characteristics of a vacuum tube by utilizing the property of the tube to oscillate, when placed in a regenerative circuit arrangement.

It is another object of this invention to provide a circuit for determining the transconductance characteristics of a vacuum tube from certain preselected circuit adjustments which are necessary to institute oscillations in the tube when the latter is inserted in a regenerative circuit arrangement.

It is another object of this invention to provide a circuit of the foregoing type in which the transconductance of the vacuum tube is made directly readable from the circuit adjustment required to institute oscillations.

It is another object of this invention to provide a method of and apparatus for determining the transconductance characteristics of a vacuum tube over wide and heretofore unexplorable range of operating levels.

Other objects and features of the invention will become apparent upon a careful consideration of the following detailed description when taken together with the accompanying drawings.

Fig. 1 is a detailed circuit diagram of an exemplary embodiment of the invention, and Fig. 2 is a detailed circuit diagram of a variant embodiment of the invention.

For purposes of simplification the tube under test in the embodiment of Fig. 1, to which reference is now had, is illustrated as a triode 10. It being understood that according to the teachings of the invention, the transconductance between the grid and anode of a pentode, or between any pair of electrodes in a multi-electrode thermionic vacuum tube may be checked with equal convenience. In the circuit connections, the plate of tube 10 is connected by way of potentiometer 16 to a source of steady operating potential 18. The resistance of potentiometer 16, for reasons hereinafter to become obvious, is preferably chosen to be much smaller than the variational plate resistance of the tube under test. Operating bias for the tube is selectably provided by way of its cathode connection to the movable arm on potentiometer 11, the resistance of which is connected in series with resistance 12 between the positive side of potential 18 and ground. To prevent degeneration, the resistance between the movable arm on potentiometer 11 and ground is by-passed by capacitance 21. The regenerative connection which is necessary to the operation of the invention is provided by way of audio transformer 13 in the embodiment. The secondary winding of this transformer is connected to the grid of the tube under test, and the primary is connected via blocking condenser 15 to the movable arm 17 of potentiometer 16.

According to the teachings of the invention the movable arm 17 of potentiometer 16 is adjusted until oscillation is instituted in the circuit.

Oscillation occurs, as hereinafter shown, when the movable arm of potentiometer is set so that the reciprocal of the resistance between it and the high voltage end of the potentiometer is equal to the transconductance (GM) of the tube under test. The presence of oscillations in the circuit can be indicated by any one of several well known methods. For instance, as here shown a pair of ear phones 14 may be employed if desired. It should be noted, however, that in order to secure most dependable operating performance from the circuit, the device used to indicate the presence of oscillation should preferably be of a high impedance type so that it will produce a minimum loading effect on the circuit, and therefore a minimum of disturbance to the normal action of the circuit.

From the circuit of Fig. 1 it may be seen that, $$(1) \quad A = \frac{E_0}{E_i} = \frac{(Gm)(Rp)(Ra)}{R+Rp} = \frac{1}{B}$$

where $A$ is the gain of the stage as expressed by the ratio of the voltage signal $E_0$ appearing across the resistance $Ra$ of potentiometer 16, and the voltage signal $E_i$ appearing between the grid and cathode. $Rp$ is the variational plate resistance of the tube 10. $Gm$ is the transconductance of the tube, and $R$ is the total resistance of potentiometer 16. And $B$ is the ratio of transformation of transformer 13. When the condition that $Rp$ is much greater than $R$ is complied with, Equation 1 simplifies to, $$(2) \quad A = \frac{E_0}{E_i} = \frac{(Gm)(Rp)(Ra)}{Rp} = \frac{1}{B}$$

Cancelling out the $Rp$ term, Equation 2 becomes, $$(3) \quad A = \frac{E_0}{E_i} = (Gm)(Ra) = \frac{1}{B}$$

or simply, $$(4) \quad \frac{1}{B} = (Gm)(Ra)$$

Since, however, the grid impedance $Zg$ of tube 10 may load the transformer 13 under certain bias and grid excitation conditions, the resistance $Ra$ between the movable tap 17 on potentiometer 16, and the B+ lead 18 will be shunted by an impedance $Za$ which is equal to, $$(5) \quad Za = \frac{Zg}{B^2}$$

In this case the ($Ra$) term of Equation 4 becomes the parallel combination $Zm$ of impedances $Ra$ and $Za$. Thus Equation 4 becomes $$(6) \quad \frac{1}{B} = (Gm)(Zm)$$

or substituting for ($Zm$)

$$(7) \quad \frac{1}{B} = \frac{(Gm)(Ra)(Zg)}{B^2 Ra + Zg}$$

Rearranging Equation 7

$$(8) \quad Gm = \frac{1}{BRa} + \frac{B}{Zg}$$

When the ratio of transformation is equal to unity, Equation 8 simplifies to $$(9) \quad Gm = \frac{1}{Ra} + \frac{1}{Za}$$

Under most operating conditions the second term of equation is so small that it can be neglected. Therefore, $$(10) \quad Gm = \frac{1}{Ra}$$

Consequently from Equation 10 it will be recognized that potentiometer 16 may be calibrated, as indicated at 22, directly in terms of micromhos, so long as $Rp$ is maintained greater than $R$; B equal to unity, and $Zg$ equal to infinity. When however the resistance R of potentiometer 16 becomes an appreciable fraction of the variational plate resistance $Rp$ of the tube, the calibration based on Equation 10 must be multiplied by a correction factor K which according to Equation 1 is equal to $$\frac{R+Rp}{Rp}$$

As aforementioned, however, it is desirable to maintain $Rp$ greater than $R$ since when $R$ is equal to an appreciable fraction of $Rp$ small variations in $Rp$ as experienced in checking the transconductance of different tubes will necessitate recomputation of the correction factor K for each tube.

It will be further recognized from Equation 10 that if the taper of potentiometer 16 is linear, a hyperbolic scale will result. This causes scale crowding which can be avoided by selecting a taper for potentiometer 16 which will provide a more nearly linear scale.

One very distinctive and advantageous property of the present invention is that the transition of tube 10 from a quiescent state to an oscillatory state is not gradual, but abrupt. That is, the circuit breaks sharply from quiescence to a state of oscillation as the potentiometer is moved to its critical setting. Accordingly, detection of oscillation in the circuit, and location of the critical point on potentiometer 16 may be rapidly and accurately determined.

In the embodiment of Fig. 1 it will be recognized that when the condition $Rp$ is greater than $R$ is observed and the potentiometer 16 is calibrated according to Equation 10, the minimum value of transconductance which is directly readable from the potentiometer is limited by the size of resistance R. It being understood, however, that the value of R may be increased with respect to $Rp$ and the above mentioned correction factor K can be applied without impairing the accuracy of the system. In cases, however, where it is desired to measure values of transconductance, without the aid of the correction factor K that is by maintaining $Rp$ is greater than $R$, the arrangement of Fig. 2 may be employed. In Fig. 2 the feedback voltage available at the movable arm 17 of potentiometer 16 is fed through an amplifier circuit 19, for example one having inverse feed back, stabilized which is equipped to provide amplification and proper signal phase to the grid of the tube under test. In this embodiment, $$(11) \quad Gm = \frac{1}{RaB}$$

where B is the voltage amplification constant of the amplifier 19.

It will be noted that amplifier 19 replaces the transformer 13 in Fig. 1. Hence its amplification factor may be substituted for the transformation ratio of the transformer. One advantage of this embodiment is that when transconductance is to be measured in an operating region which causes power to be drawn by the grid circuit of the tube under test, this power can be provided by the amplifier 19, instead of by the tube itself.

As indicated by Equation 11 the effective value of resistance Ra is multiplied by the amplification constant of the amplifier 19; hence lower values of transconductance can be measured without impairing the accuracy of the system. Alternatively, the movable arm of potentiometer 16 can be fixed and the gain B of the amplifier can be made adjustable.

Although I have shown and described only certain and specific embodiments of the invention it is to be understood that I am fully aware of the many modifications possible thereof. Therefore this invention is not to be limited except insofar as is necessitated by the spirit of the prior art and the scope of the appended claims.

The invention described herein may be manufactured and used by or for the Government of the United States of America for governmental purposes without the payment of any royalties thereon or therefor.

What is claimed is:

1. A method of determining the transconductance between a pair of electrodes in a thermionic vacuum tube, which comprises regeneratively feeding back a signal from one of said electrodes to the other of said electrodes, adjusting the amplitude of the feedback signal until the threshold of oscillations has been reached, and indicating tube transconductance from the amount of feedback necessary to reach the threshold of oscillation.

2. A method of determining the transconductance between a pair of electrodes in a thermionic vacuum tube which comprises amplifying and regeneratively feeding back a signal from one of said electrodes to the other of said electrodes, adjusting the amplitude of the feedback signal until the threshold of oscillations has been reached, and indicating tube transconductance from the amount of feedback necessary to reach the threshold of oscillation.

3. A method of determining the transconductance between a pair of electrodes in a thermionic vacuum tube which comprises amplifying and regeneratively feeding back a signal from one of said electrodes to the other of said electrodes, adjusting the amount of amplification until the threshold of oscillations has been reached, and indicating tube transconductance from the amount of amplification necessary to reach the threshold of oscillation.

4. A method of determining the transconductance between the grid and anode of a thermionic vacuum tube, which comprises loading the anode circuit of said tube with a resistance having a value much less than the anode variational resistance, regeneratively feeding back a signal from said loading resistance to the grid of said tube, adjusting the amount of feedback until the threshold of oscillations has been reached and indicating tube transconductance from the amount of feedback necessary to reach the threshold of oscillation.

5. A method of determining the transconductance between the grid and anode of a thermionic vacuum tube, which comprises loading the anode circuit of said tube with a resistance having a value much less than the anode variational resistance, amplifying and regeneratively feeding back a signal from said loading resistance to the grid of said tube, adjusting the amount of feedback until the threshold of oscillations has been reached and indicating tube transconductance from the amount of feedback necessary to reach the threshold of oscillation.

LA VERNE R. PHILPOTT.

REFERENCES CITED

The following references are of record in the file of this patent:

UNITED STATES PATENTS

| Number | Name | Date |
|---|---|---|
| 1,632,389 | Curtis | June 14, 1927 |
| 2,024,489 | Van der Pol | Dec. 17, 1935 |
| 2,173,427 | Scott | Sept. 19, 1939 |